(12) United States Patent
Eslami

(10) Patent No.: US 10,666,858 B2
(45) Date of Patent: May 26, 2020

(54) DEEP-LEARNING-BASED SYSTEM TO ASSIST CAMERA AUTOFOCUS

(71) Applicant: Sony Corporation, Tokyo (JP)

(72) Inventor: Ramin Eslami, Milpitas, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/175,255

(22) Filed: Oct. 30, 2018

(65) Prior Publication Data

US 2020/0137298 A1 Apr. 30, 2020

(51) Int. Cl.
*H04N 5/232* (2006.01)
*G06N 3/04* (2006.01)

(52) U.S. Cl.
CPC ......... *H04N 5/23219* (2013.01); *G06N 3/04* (2013.01); *H04N 5/23222* (2013.01); *H04N 5/232127* (2018.08); *H04N 5/232933* (2018.08)

(58) Field of Classification Search
CPC ......... H04N 5/23219; H04N 5/232933; H04N 5/23222; H04N 5/232127; G06N 3/04
See application file for complete search history.

(56) References Cited

U.S. PATENT DOCUMENTS

| | | | | |
|---|---|---|---|---|
| 2004/0184671 A1* | 9/2004 | Fukuda | .............. | G06K 9/00228 382/274 |
| 2009/0245776 A1* | 10/2009 | Wang | ................. | H04N 5/23212 396/121 |
| 2010/0226636 A1* | 9/2010 | Hirai | ................... | H04N 5/23212 396/123 |
| 2011/0043680 A1* | 2/2011 | Uehara | .............. | H04N 5/23212 348/349 |
| 2013/0265451 A1* | 10/2013 | Son | ..................... | H04N 5/23222 348/207.1 |
| 2014/0078372 A1* | 3/2014 | Yamashita | ......... | H04N 5/23293 348/333.02 |
| 2016/0092739 A1* | 3/2016 | Oami | ................. | G06K 9/00771 348/159 |

FOREIGN PATENT DOCUMENTS

| | | |
|---|---|---|
| CN | 107516316 A | 12/2017 |
| JP | 2017-116403 A | 6/2017 |

OTHER PUBLICATIONS

Gabriel L. Oliveira et al., "Deep Learning for Human Part Discovery in Images", pp. 1-8.
David Frank et al., "Fully Convolutional Nerual Network for Body Parts Segementation", pp. 1-4.
Tuan-Hung Vu, " Context-aware CNNs for person head detection", IEEE Xplore, pp. 2893-2901.

* cited by examiner

*Primary Examiner* — Gevell V Selby
(74) *Attorney, Agent, or Firm* — Haverstock & Owens LLP

(57) ABSTRACT

To overcome several issues of autofocusing, a deep-learning-based autofocus system utilizes a subject's body to autofocus on the subject's face. The subject, including the subject's body and face/head, are determined utilizing image processing methods, and based on the detection, the subject's face/head is automatically focused on.

26 Claims, 7 Drawing Sheets

DEEP-LEARNING-BASED SYSTEM TO ASSIST CAMERA AUTOFOCUS

FIELD OF THE INVENTION

The present invention relates to cameras. More specifically, the present invention relates to camera autofocusing.

BACKGROUND OF THE INVENTION

Autofocus is a common implementation for digital cameras, where an autofocus point is selected, and the captured image will be in focus on that point. The autofocus point is either automatically selected by the camera or manually by a user. Typically, a desired autofocus point for a picture is a subject's face or head. Camera face detection is a means to facilitate this objective. However, face detection fails in many cases such as scenes with backlighting, small subjects (in terms of the area covered in the image), side-view faces, and moving subjects relative to the camera. To address these issues, professional photographers often use a flexible spot autofocus point to focus on the desired object. For example, the photographer manually selects the desired autofocus point, and then waits for the right moment to take the shot. However, the manual focus, wait and shoot method has many drawbacks as well.

SUMMARY OF THE INVENTION

To overcome several issues of autofocusing, a deep-learning-based autofocus system utilizes a subject's body to autofocus on the subject's face. The subject, including the subject's body and face/head, are determined utilizing image processing methods, and based on the detection, the subject's face/head is automatically focused on.

In one aspect, a method programmed in a non-transitory memory of a device comprises processing image content to generate a separated image content using a neural network-based algorithm including separating the image content into body areas and head areas, receiving selection information and autofocusing on a face or head of a subject based on the separated image content and the selection information. The neural network-based algorithm comprises a fully convolutional network algorithm. Receiving the selection information includes receiving a touchscreen input from a user. Receiving the selection information includes an automatic selection by the device. When the selection information includes a body area of the subject, the head associated with the body area is autofocused on. Determining the head associated with the body area includes computing a distance between one or more head areas and the body area and finding a head area with a minimum distance from the body area. Processing the image content includes utilizing a heat map and a thresholded heat map to distinguish the head areas by bisecting the head areas. Processing the image content includes applying a head mask to isolate the head areas.

In another aspect, an apparatus comprises a non-transitory memory for storing an application, the application for: processing image content to generate a separated image content using a neural network-based algorithm including separating the image content into body areas and head areas, receiving selection information and autofocusing on a face or head of a subject based on the separated image content and the selection information and a processor coupled to the memory, the processor configured for processing the application. The neural network-based algorithm comprises a fully convolutional network algorithm. Receiving the selection information includes receiving a touchscreen input from a user. Receiving the selection information includes an automatic selection by the device. When the selection information includes a body area of the subject, the head associated with the body area is autofocused on. Determining the head associated with the body area includes computing a distance between one or more head areas and the body area and finding a head area with a minimum distance from the body area. Processing the image content includes utilizing a heat map and a thresholded heat map to distinguish the head areas by bisecting the head areas. Processing the image content includes applying a head mask to isolate the head areas.

In another aspect, a camera device comprising: a lens, a non-transitory memory for storing an application, the application for: processing image content to generate a separated image content using a neural network-based algorithm including separating the image content into body areas and head areas, receiving selection information and autofocusing, by moving the lens, on a face or head of a subject based on the separated image content and the selection information and a processor coupled to the memory, the processor configured for processing the application. The neural network-based algorithm comprises a fully convolutional network algorithm. Receiving the selection information includes receiving a touchscreen input from a user. Receiving the selection information includes an automatic selection by the device. When the selection information includes a body area of the subject, the head associated with the body area is autofocused on. Determining the head associated with the body area includes computing a distance between one or more head areas and the body area and finding a head area with a minimum distance from the body area. Processing the image content includes utilizing a heat map and a thresholded heat map to distinguish the head areas by bisecting the head areas. Processing the image content includes applying a head mask to isolate the head areas.

DETAILED DESCRIPTION OF THE PREFERRED EMBODIMENT

When an autofocus point is selected (e.g., by a camera automatically or by a user), the desired point is a subject's face or head.

Figure 1:
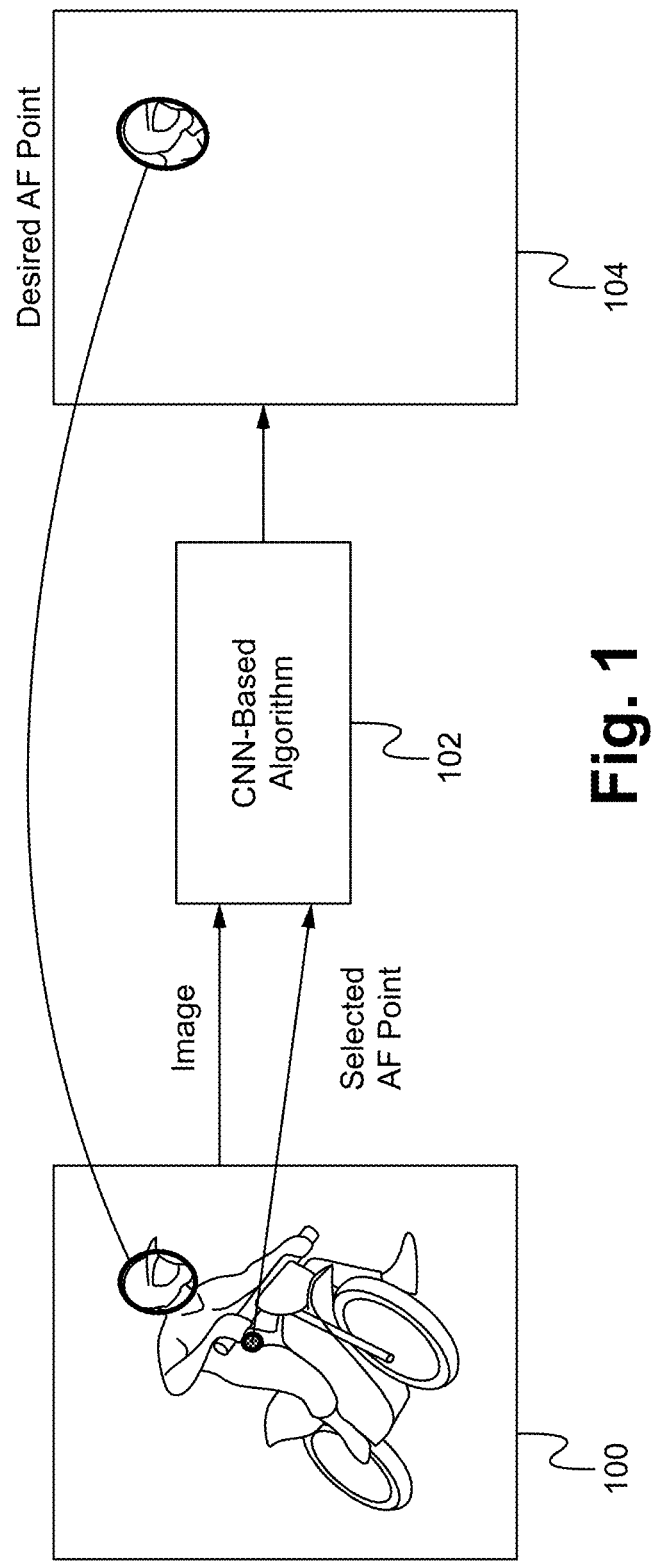
FIG. 1 illustrates a diagram of a flow of a deep-learning-based autofocus system according to some embodiments.

FIG. 1 illustrates a diagram of a flow of a deep-learning-based autofocus system according to some embodiments. In the step 100, an autofocus point is selected. The autofocus point is able to be selected automatically, manually or a combination thereof. For example, a camera device implements an autofocus point selection algorithm to determine a subject's body, face or head and select a point within. In another example, a user touches a touchscreen display on a camera/phone (e.g., touches the part of the screen showing a person's body), and where the point in the image is touched is the autofocus point. In an example of automatic selection of an autofocus point, the device determines a body and/or face/head (e.g., using image/video processing), and selects the body and/or face/head as the autofocus point.

In the step 102, a Convolution Neural Network (CNN)-based algorithm performs image processing including body and head segmentation. The CNN-based algorithm is implemented by first training so that the process is able to detect human areas, and more specifically, body areas and head/face areas. The training is able to be implemented in any manner, such as manually confirming which areas are body areas and which are head areas in images. The CNN-based algorithm is able to implement artificial intelligence to further learn and apply what is learned to determine body areas, head areas and background areas. The CNN-based algorithm is described further herein.

In the step 104, a desired autofocus point is determined. Using the body and head segmentation from the CNN-based algorithm, a desired autofocus point (e.g, a head/face) is selected. For example, the camera autofocuses on the subject's head by adjusting the lens/sensor accordingly.

In some embodiments, fewer or additional steps are implemented. In some embodiments, the order of the steps is modified.

Figure 2:
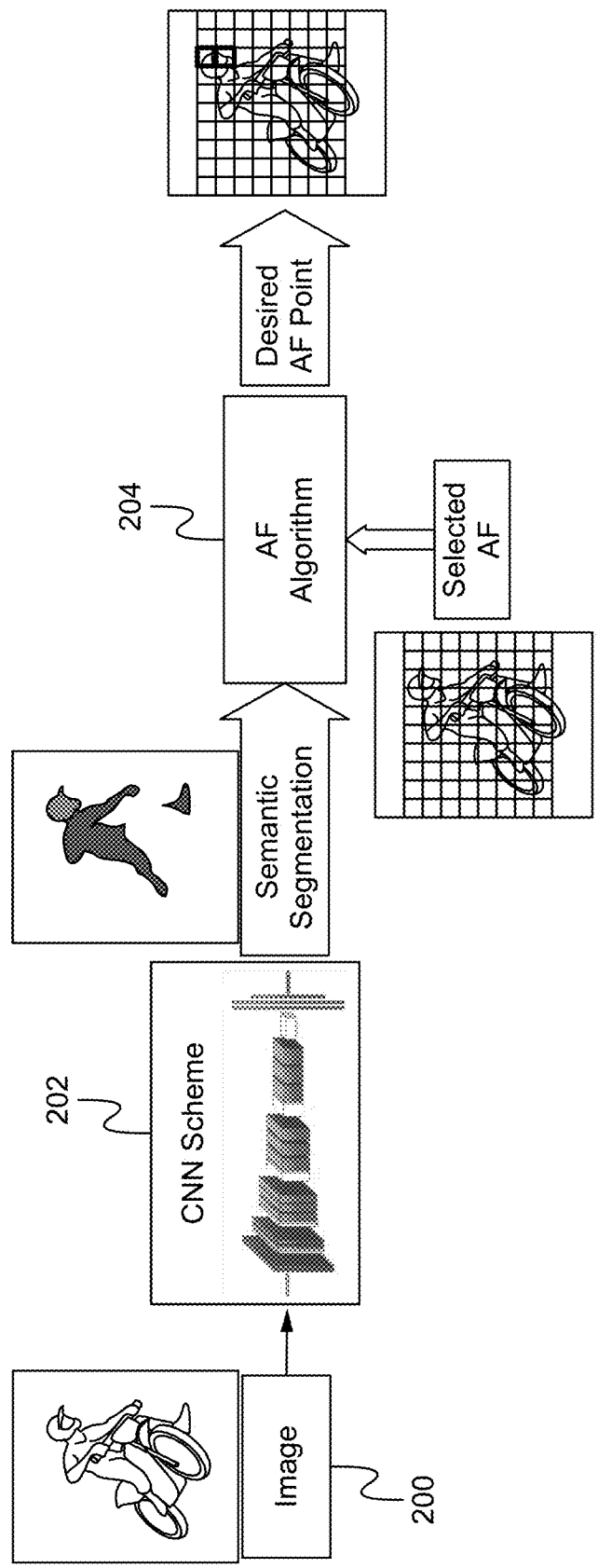
FIG. 2 illustrates a flowchart of a method of deep-learning-based autofocus according to some embodiments.

FIG. 2 illustrates a flowchart of a method of deep-learning-based autofocus according to some embodiments. An image is acquired in the step 200. Acquiring the image includes pointing a camera at a subject such that the contents of the image are able to be processed by the camera.

The image is processed using the CNN-based algorithm, in the step 202. The CNN-based algorithm separates the image into body and head parts (e.g., highlighting the body and head and blacking out the remaining contents of an image). In some embodiments, the body and head areas are distinguished (e.g., pixels within the body area are assigned code 0 and pixels within the head area are assigned code 1, and all of the other pixels are background and assigned code 2, or each area is assigned to a class). In some embodiments, the process of separating the head areas and body areas from the background is a multi-step process. For example, initially human areas are separated from any background information, and then the human areas are separated into body areas and head areas. The segmented information is sent to an autofocus algorithm. Selection information is also able to be sent to the autofocus algorithm. The selection information is a point selected by a user or automatically selected by a device. For example, the user pushes a touchscreen point at the location of a subject's body or head. In some embodiments, the CNN-based algorithm is a Fully Convolutional Network (FCN)-based algorithm or a modified version thereof. In some embodiments, all objects are labeled/classified into various groups/classes such as bicycles, chairs, people, animals, and so on, where the number of groups/classes may be very high such as 20 or more. In some embodiments, the number of groups/classes is reduced to head areas, body areas and background, where background is anything that is not classified as a head area or a body area. In another example, the groups/classes are reduced to humans and background, and then humans are sub-divided into sub-classes of head areas and body areas. If the network had been trained using the large number of classes, then the network is retrained with the limited number (e.g., 3—body, head and background) of classes.

In the step 204, the autofocus algorithm uses the segmentation information and the selection information to determine a desired autofocus point. For example, if the selected point is within a body area or head area, then the head area (based on the earlier segmentation) that corresponds with the selected point is the desired autofocus point. Furthering the example, a subject's torso is selected by the user, and the subject's body and head have been segmented by the CNN-based algorithm, so the autofocus algorithm determines the subject's head is the autofocus point. When the selection is located on a body region, the closest connected head in the horizontal direction above the body is returned. For example, a distance is determined from a specific point in the body region (selected point in the region or a top point of the region) to head regions, but the distance determination is limited to head regions above the body region. Furthering the example, if a body is selected, and a first head is determined above the body and a second head is determined to the right of the body, even if the head to the right of the body has a shorter distance, since it is not above the body, it is not counted/utilized in the distance determination. When the selection is located on a head region, the same head is returned. When a background is selected, the autofocus is on the point selected. In some embodiments, fewer or additional steps are implemented. For example, the device (e.g., camera) focuses on the desired autofocus point and/or acquires a picture. In some embodiments, the order of the steps is modified.

Figure 3:
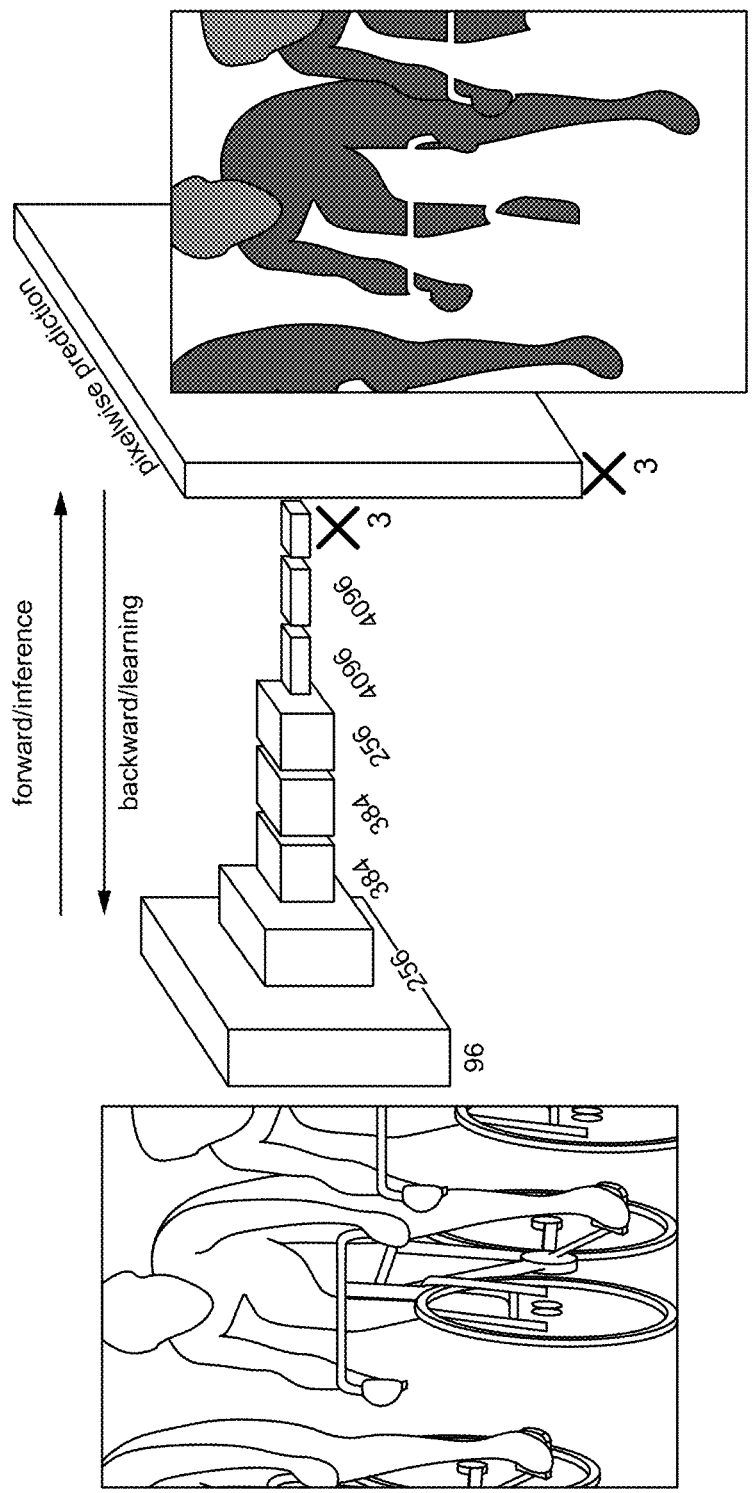
FIG. 3 illustrates a diagram of a modified FCN-based algorithm for implementing segmentation according to some embodiments.

FIG. 3 illustrates a diagram of a modified FCN-based algorithm for implementing segmentation according to some embodiments. The modified FCN-based algorithm utilizes three groups/classes to classify parts of an image—head, body and background. The FCN-based algorithm is trained (e.g., using thousands or more images). The FCN-based algorithm also goes through a validation step.

Figure 4:
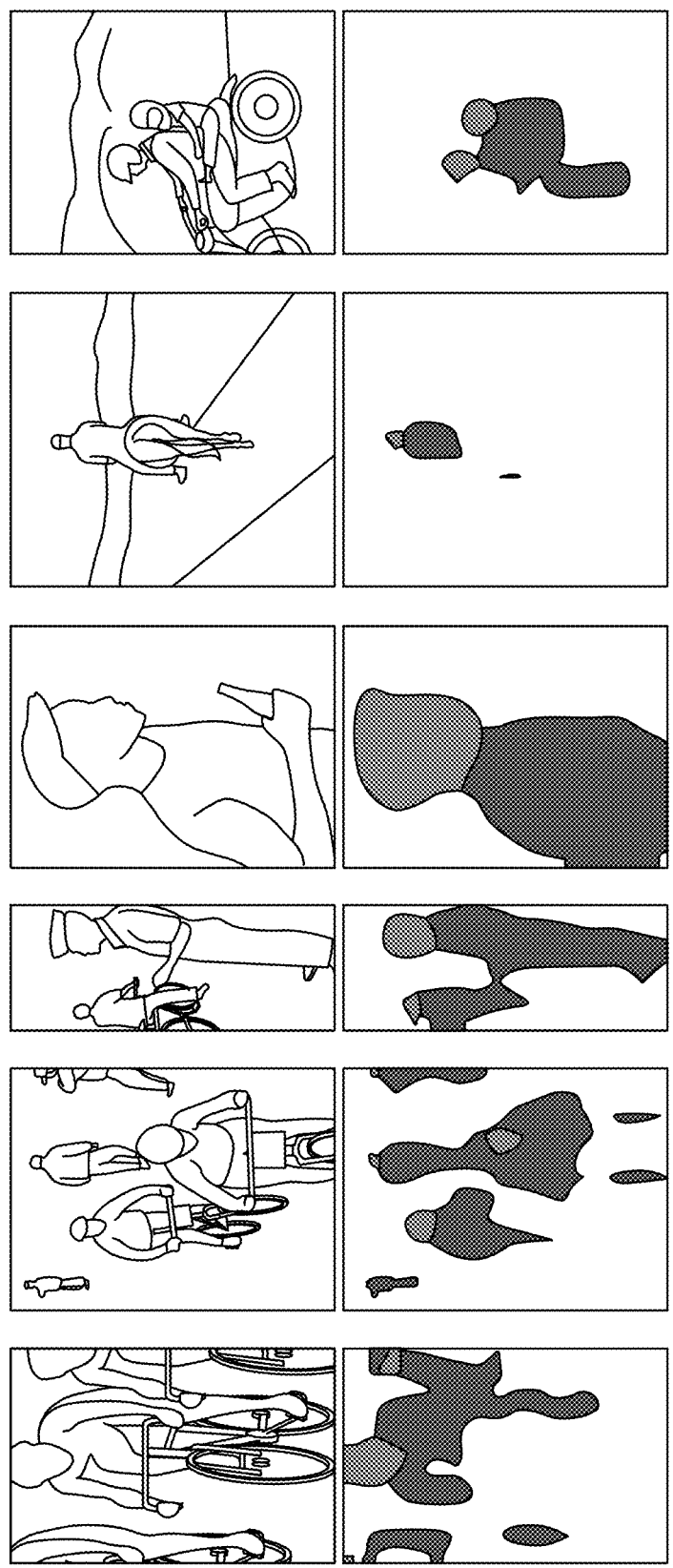
FIG. 4 illustrates exemplary images and corresponding head/body segmentation according to some embodiments.

FIG. 4 illustrates exemplary images and corresponding head/body segmentation according to some embodiments. As shown, the FCN-based algorithm is able to detect heads at difficult conditions (e.g., heads with side and back views, with hat and helmet, in dark scenes or with backlighting).

Figure 5:
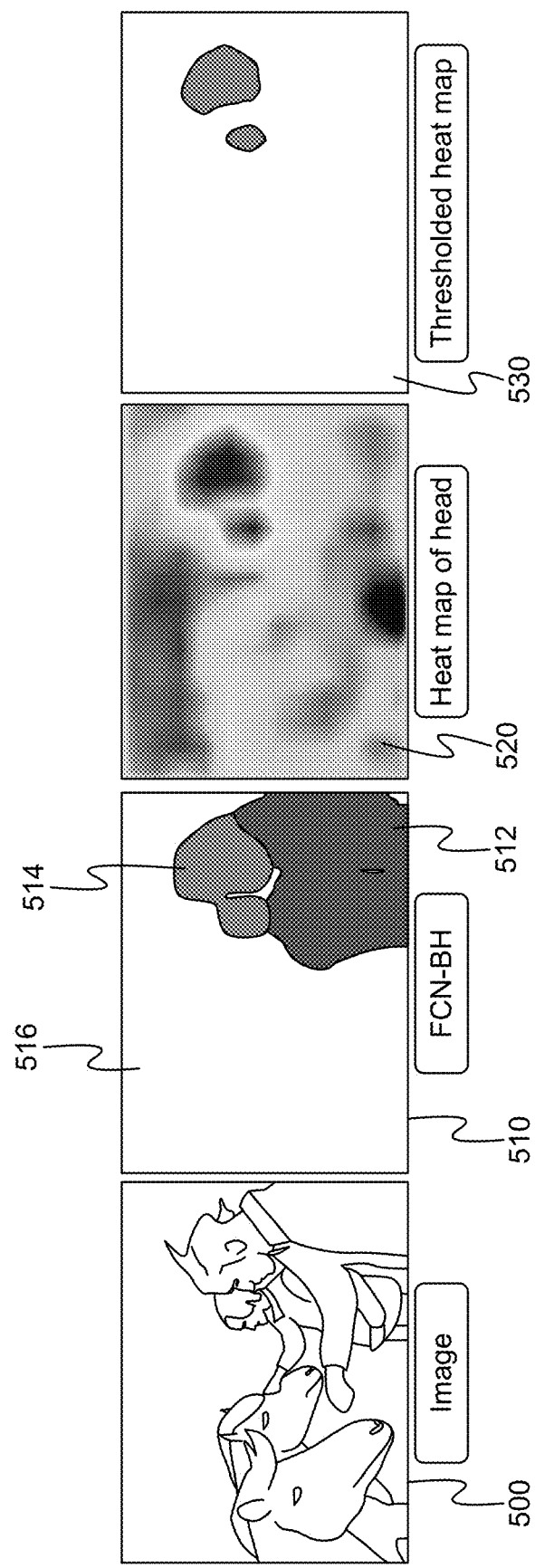
FIG. 5 illustrates an implementation of an improved FCN-based algorithm according to some embodiments.

FIG. 5 illustrates an implementation of an improved FCN-based algorithm according to some embodiments. As shown, an image 500 is processed using the FCN-based algorithm 510 to generate body regions 512, head regions 514 and a background 516. A heat map 520 is generated of the head regions, and head regions that are too wide are bisected using a thresholded heat map 530. A thresholded heat map 530 determines any heat pixels above a threshold (or below a threshold depending on the implementation) are considered background pixels similar to the other background pixels. As shown in the heat map 520 and the thresholded heat map 530, only the darkest head areas remain in the thresholded heat map 530.

Figure 6:
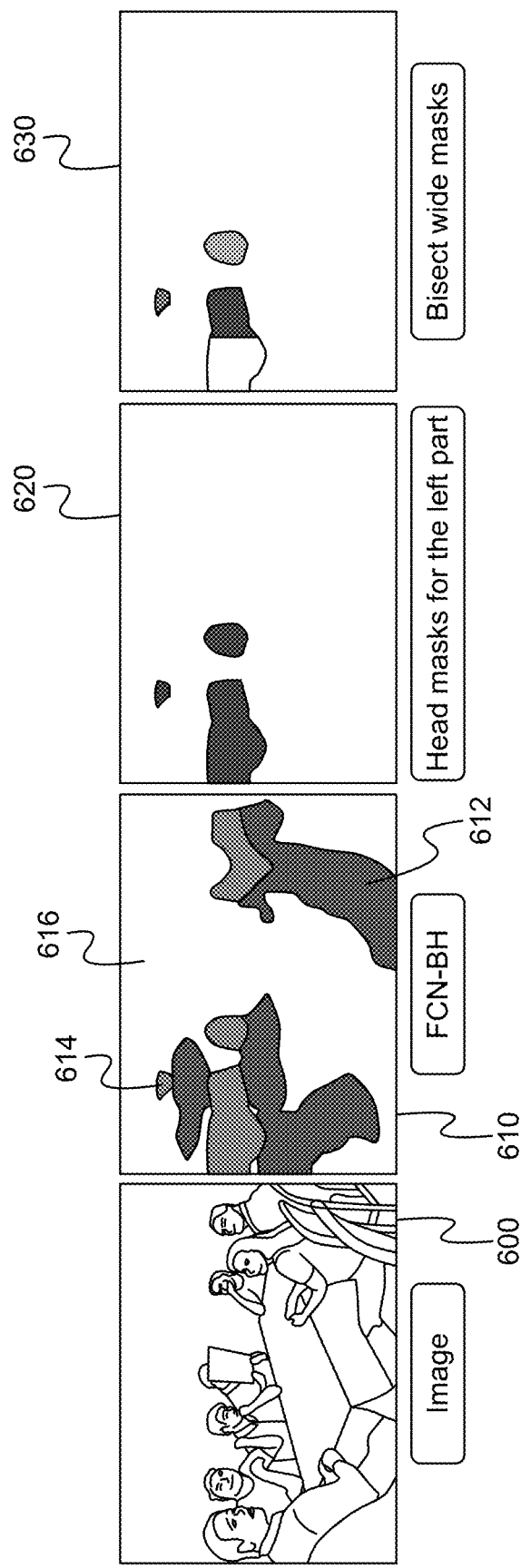
FIG. 6 illustrates an implementation of an improved FCN-based algorithm according to some embodiments.

FIG. 6 illustrates an implementation of an improved FCN-based algorithm according to some embodiments. As shown, an image 600 is processed using the FCN-based algorithm 610 to generate body regions 612, head regions 614 and a background 616. A head mask 620 is applied which isolates the head regions on the left side of the image 600. Head regions that are too wide are bisected using any manner 630 (e.g., a thresholded heat map), such that only heat regions remain.

After the processing of separating the body and head regions from the background, including utilizing heat maps and/or applying head masks, a selection (e.g., a camera user's selection or an automatic selection) is processed to determine the autofocus point.

Figure 7:
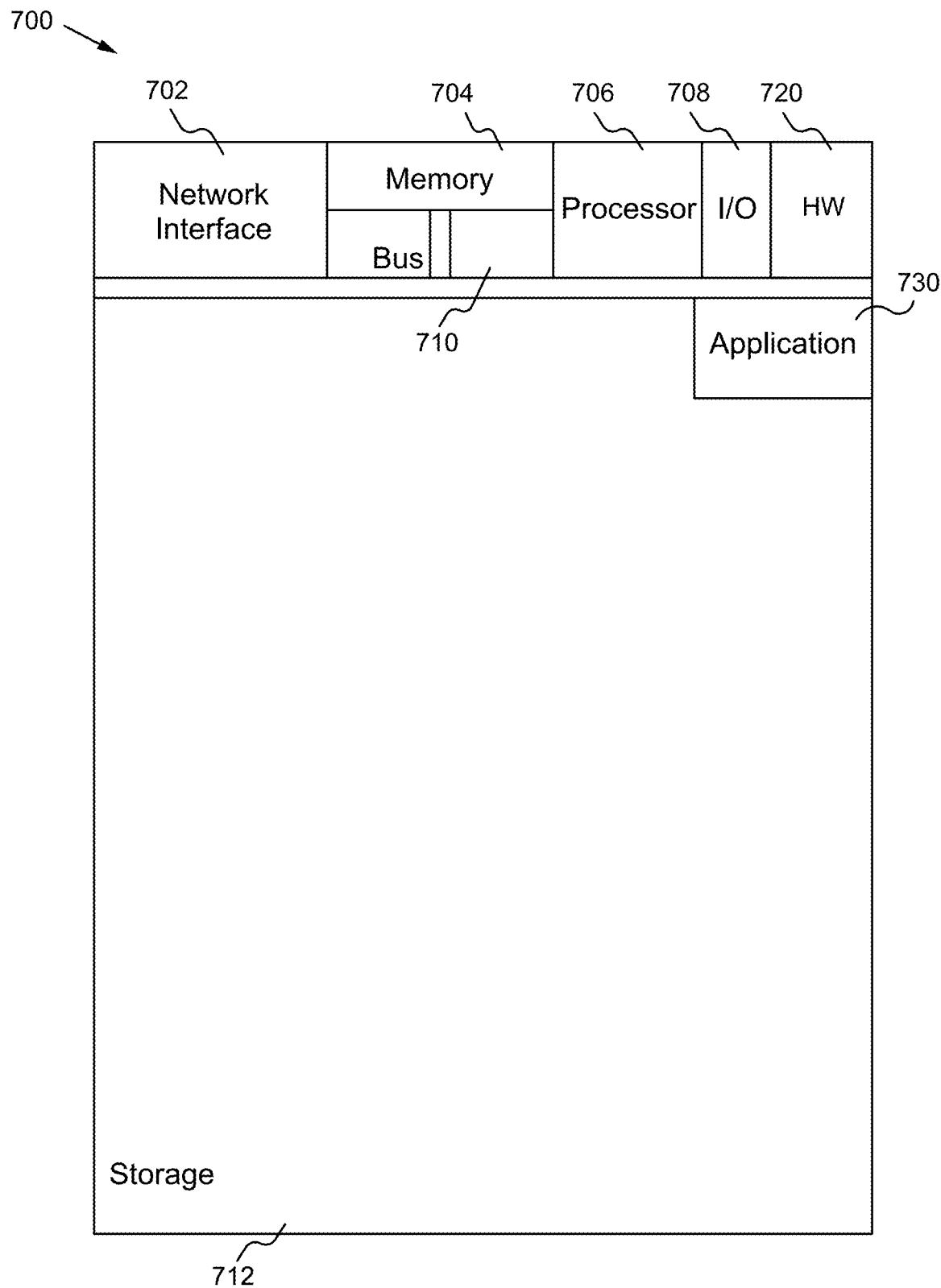
FIG. 7 illustrates a block diagram of an exemplary computing device configured to implement the deep-learning-based autofocus method according to some embodiments.

FIG. 7 illustrates a block diagram of an exemplary computing device configured to implement the deep-learning-based autofocus method according to some embodiments. The computing device 700 is able to be used to acquire, store, compute, process, communicate and/or display information such as images and videos. The computing device 700 is able to implement any of the deep-learning-based autofocus method aspects. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. Deep-learning-based autofocus application(s) 730 used to implement the deep-learning-based autofocus method are likely to be stored in the storage device 712 and memory 704 and processed as applications are typically processed. More or fewer components shown in FIG. 7 are able to be included in the computing device 700. In some embodiments, deep-learning-based autofocus hardware 720 is included. Although the computing device 700 in FIG. 7 includes applications 730 and hardware 720 for the deep-learning-based autofocus method, the deep-learning-based autofocus method is able to be implemented on a computing device in hardware, firmware, software or any combination thereof. For example, in some embodiments, the deep-learning-based autofocus applications 730 are programmed in a memory and executed using a processor. In another example, in some embodiments, the deep-learning-based autofocus hardware 720 is programmed hardware logic including gates specifically designed to implement the deep-learning-based autofocus method.

In some embodiments, the deep-learning-based autofocus application(s) 730 include several applications and/or modules. In some embodiments, modules include one or more sub-modules as well. In some embodiments, fewer or additional modules are able to be included.

In some embodiments, the deep-learning-based autofocus hardware 720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the deep-learning-based autofocus method described herein, devices such as digital cameras/camcorders are used to acquire content. The deep-learning-based autofocus method is able to be implemented with user assistance or automatically without user involvement to efficiently autofocus.

In operation, the deep-learning-based autofocus method more efficiently and more correctly determines head areas in an image to enable better autofocusing.

Some Embodiments of a Deep-Learning-Based System to Assist Camera Autofocus

1. A method programmed in a non-transitory memory of a device comprising:
processing image content to generate a separated image content using a neural network-based algorithm including separating the image content into body areas and head areas;
receiving selection information; and
autofocusing on a face or head of a subject based on the separated image content and the selection information.

2. The method of clause 1 wherein the neural network-based algorithm comprises a fully convolutional network algorithm.

3. The method of clause 1 wherein receiving the selection information includes receiving a touchscreen input from a user.

4. The method of clause 1 wherein receiving the selection information includes an automatic selection by the device.

5. The method of clause 1 wherein when the selection information includes a body area of the subject, the head associated with the body area is autofocused on.

6. The method of clause 5 wherein determining the head associated with the body area includes computing a distance between one or more head areas and the body area and finding a head area with a minimum distance from the body area.

7. The method of clause 1 wherein processing the image content includes utilizing a heat map and a thresholded heat map to distinguish the head areas by bisecting the head areas.

8. The method of clause 1 wherein processing the image content includes applying a head mask to isolate the head areas.

9. An apparatus comprising:
a non-transitory memory for storing an application, the application for:
processing image content to generate a separated image content using a neural network-based algorithm including separating the image content into body areas and head areas;
receiving selection information; and
autofocusing on a face or head of a subject based on the separated image content and the selection information; and
a processor coupled to the memory, the processor configured for processing the application.

10. The apparatus of clause 9 wherein the neural network-based algorithm comprises a fully convolutional network algorithm.

11. The apparatus of clause 9 wherein receiving the selection information includes receiving a touchscreen input from a user.

12. The apparatus of clause 9 wherein receiving the selection information includes an automatic selection by the device.

13. The apparatus of clause 9 wherein when the selection information includes a body area of the subject, the head associated with the body area is autofocused on.

14. The apparatus of clause 13 wherein determining the head associated with the body area includes computing a distance between one or more head areas and the body area and finding a head area with a minimum distance from the body area.

15. The apparatus of clause 9 wherein processing the image content includes utilizing a heat map and a thresholded heat map to distinguish the head areas by bisecting the head areas.

16. The apparatus of clause 9 wherein processing the image content includes applying a head mask to isolate the head areas.

17. A camera device comprising:
    a lens;
    a non-transitory memory for storing an application, the application for:
        processing image content to generate a separated image content using a neural network-based algorithm including separating the image content into body areas and head areas;
        receiving selection information; and
        autofocusing, by moving the lens, on a face or head of a subject based on the separated image content and the selection information; and
    a processor coupled to the memory, the processor configured for processing the application.

18. The camera device of clause 17 wherein the neural network-based algorithm comprises a fully convolutional network algorithm.

19. The camera device of clause 17 wherein receiving the selection information includes receiving a touchscreen input from a user.

20. The camera device of clause 17 wherein receiving the selection information includes an automatic selection by the device.

21. The camera device of clause 17 wherein when the selection information includes a body area of the subject, the head associated with the body area is autofocused on.

22. The camera device of clause 21 wherein determining the head associated with the body area includes computing a distance between one or more head areas and the body area and finding a head area with a minimum distance from the body area.

23. The camera device of clause 17 wherein processing the image content includes utilizing a heat map and a thresholded heat map to distinguish the head areas by bisecting the head areas.

24. The camera device of clause 17 wherein processing the image content includes applying a head mask to isolate the head areas.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    processing image content to generate a separated image content using a neural network-based algorithm including separating the image content into body areas and head areas, wherein processing the image content includes utilizing a heat map and a thresholded heat map to distinguish the head areas by bisecting the head areas;
    receiving selection information; and
    autofocusing on a face or head of a subject based on the separated image content and the selection information.

2. The method of claim 1 wherein the neural network-based algorithm comprises a fully convolutional network algorithm.

3. The method of claim 1 wherein receiving the selection information includes receiving a touchscreen input from a user.

4. The method of claim 1 wherein receiving the selection information includes an automatic selection by the device.

5. The method of claim 1 wherein when the selection information includes a body area of the subject, the head associated with the body area is autofocused on.

6. The method of claim 5 wherein determining the head associated with the body area includes computing a distance between one or more head areas and the body area and finding a head area with a minimum distance from the body area.

7. The method of claim 1 wherein processing the image content includes applying a head mask to isolate the head areas.

8. An apparatus comprising:
    a non-transitory memory for storing an application, the application for:
        processing image content to generate a separated image content using a neural network-based algorithm including separating the image content into body areas and head areas, wherein processing the image content includes utilizing a heat map and a thresholded heat map to distinguish the head areas by bisecting the head areas;
        receiving selection information; and
        autofocusing on a face or head of a subject based on the separated image content and the selection information; and
    a processor coupled to the memory, the processor configured for processing the application.

9. The apparatus of claim 8 wherein the neural network-based algorithm comprises a fully convolutional network algorithm.

10. The apparatus of claim 8 wherein receiving the selection information includes receiving a touchscreen input from a user.

11. The apparatus of claim 8 wherein receiving the selection information includes an automatic selection by the device.

12. The apparatus of claim 8 wherein when the selection information includes a body area of the subject, the head associated with the body area is autofocused on.

13. The apparatus of claim 12 wherein determining the head associated with the body area includes computing a distance between one or more head areas and the body area and finding a head area with a minimum distance from the body area.

14. The apparatus of claim 8 wherein processing the image content includes applying a head mask to isolate the head areas.

15. A camera device comprising:
    a lens;
    a non-transitory memory for storing an application, the application for:

processing image content to generate a separated image content using a neural network-based algorithm including separating the image content into body areas and head areas;

receiving selection information, wherein processing the image content includes utilizing a heat map and a thresholded heat map to distinguish the head areas by bisecting the head areas; and autofocusing, by moving the lens, on a face or head of a subject based on the separated image content and the selection information; and a processor coupled to the memory, the processor configured for processing the application.

16. The camera device of claim 15 wherein the neural network-based algorithm comprises a fully convolutional network algorithm.

17. The camera device of claim 15 wherein receiving the selection information includes receiving a touchscreen input from a user.

18. The camera device of claim 15 wherein receiving the selection information includes an automatic selection by the device.

19. The camera device of claim 15 wherein when the selection information includes a body area of the subject, the head associated with the body area is autofocused on.

20. The camera device of claim 19 wherein determining the head associated with the body area includes computing a distance between one or more head areas and the body area and finding a head area with a minimum distance from the body area.

21. The camera device of claim 15 wherein processing the image content includes applying a head mask to isolate the head areas.

22. A method programmed in a non-transitory memory of a device comprising:

processing image content to generate a separated image content using a neural network-based algorithm including separating the image content into body areas and head areas;

receiving selection information; and autofocusing on a face or head of a subject based on the separated image content and the selection information, wherein when the selection information includes a body area of the subject, the head associated with the body area is autofocused on, wherein determining the head associated with the body area includes computing a distance between one or more head areas and the body area and finding a head area with a minimum distance from the body area.

23. The method of claim 22 wherein the neural network-based algorithm comprises a fully convolutional network algorithm.

24. The method of claim 22 wherein receiving the selection information includes receiving a touchscreen input from a user.

25. The method of claim 22 wherein receiving the selection information includes an automatic selection by the device.

26. The method of claim 22 wherein processing the image content includes applying a head mask to isolate the head areas.

* * * * *